(12) United States Patent
Higuchi

(10) Patent No.: US 11,008,705 B2
(45) Date of Patent: May 18, 2021

(54) CONVEYANCE DEVICE AND FIBROUS MATERIAL RECYCLING DEVICE

(71) Applicant: SEIKO EPSON CORPORATION, Tokyo (JP)

(72) Inventor: Naotaka Higuchi, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 238 days.

(21) Appl. No.: 16/185,475

(22) Filed: Nov. 9, 2018

(65) Prior Publication Data

US 2019/0145023 A1    May 16, 2019

(30) Foreign Application Priority Data

Nov. 10, 2017 (JP) .............................. JP2017-217209

(51) Int. Cl.
| | |
|---|---|
| *D21F 1/32* | (2006.01) |
| *B65H 5/02* | (2006.01) |
| *D21H 27/42* | (2006.01) |
| *B65G 45/18* | (2006.01) |
| *D21C 5/02* | (2006.01) |
| *B65G 45/26* | (2006.01) |
| *D01D 10/04* | (2006.01) |

(52) U.S. Cl.
CPC ............... *D21F 1/32* (2013.01); *B65G 45/18* (2013.01); *B65G 45/26* (2013.01); *B65H 5/021* (2013.01); *D21C 5/02* (2013.01); *D21H 27/42* (2013.01); *B65H 2601/261* (2013.01); *D01D 10/0445* (2013.01)

(58) Field of Classification Search
CPC ........ D21H 27/42; D21C 5/02; D21F 1/0063; D21F 1/009; D21F 1/30; D21F 1/32; D21F 1/325; D21F 1/34; D21F 1/345; B65G 45/18; B65G 45/26; B65H 5/021; B65H 2601/261; D08B 1/02; D08B 1/04
USPC ........... 162/199, 272–279; 15/21.1, 22.3, 48, 15/309.1
See application file for complete search history.

(56) References Cited

U.S. PATENT DOCUMENTS 1,678,978 A * 7/1928 Flynn ....................... D21F 1/32
                                                162/274
3,144,033 A * 8/1964 Stulberg ................ D21D 5/046
                                                134/104.1

FOREIGN PATENT DOCUMENTS

| JP | H09-57626 A | 3/1997 |
| JP | 2015-158033 A | 9/2015 |

* cited by examiner

*Primary Examiner* — Eric Hug
(74) *Attorney, Agent, or Firm* — Oliff PLC

(57) ABSTRACT

Provided is technology for effectively removing fiber from a mesh belt. A second web former for conveying a second web containing fiber deposited on a mesh belt 72 having multiple holes 72a has a brush roller 710 with numerous bristles 712 protruding from the surface and disposed in contact with the mesh belt 72. The sectional area of the bristles 712 of the brush roller 710 is smaller than the open area of the holes 72a in the mesh belt 72 so that the distal ends of the bristles 712 can enter the holes 72a.

11 Claims, 6 Drawing Sheets

CONVEYANCE DEVICE AND FIBROUS MATERIAL RECYCLING DEVICE

BACKGROUND

1. Technical Field

The present invention relates to a conveyance device and a fibrous material recycling device.

2. Related Art

Devices that remove accreted fiber from a belt having numerous holes therein are described in JP-A-2015-158033 and JP-A-H9-57626, for example. JP-A-2015-158033 describes a device that has a stationary brush, and uses the brush to remove fiber from the belt. JP-A-H9-57626 describes a device that has a pair of brushes disposed to opposite sides of the belt to remove fiber from both sides of the belt.

However, the devices taught in JP-A-2015-158033 and JP-A-H9-57626 do not address the size of the brush relative to the holes in the belt, sometimes cannot remove fiber stuck in the holes in the belt, and therefore leave room for improving fiber removal.

SUMMARY

The present invention is directed to solving the foregoing problem, and an object of the invention is to effectively remove fiber from a belt.

A conveyance device configured to convey defibrated material containing fiber deposited on a belt having multiple holes, including: a roller having multiple protrusions protruding from the surface, and disposed to contact the belt; and the sectional area of the protrusions of the roller being smaller than the open area of the holes in the belt, enabling the distal ends of the protrusions to penetrate the holes.

Because the sectional area of the protrusions of the roller is smaller than the open area of the holes in the belt, the distal ends of the protrusions protruding from the surface of the roller can penetrate the holes of the belt, and thereby effectively remove fiber from the belt. Furthermore, because the protrusions protruding from the surface of the roller can penetrate the holes of the belt, skewing of the belt can be suppressed.

In a conveyance device according to another aspect of the invention, the plane shape of the section of the protrusions is set to a size that can fit inside the shape of the holes in the belt.

Because the plane shape of the section of the protrusions is set to a size that can fit inside the shape of the holes in the belt, the protrusions can reliably penetrate the holes in the belt, and can effectively remove fiber from the belt.

In a conveyance device according to another aspect of the invention, the belt is an endless belt that is mounted on and circulates around multiple rollers.

Because the belt is an endless belt, defibrated material can be conveyed continuously while preventing accretion of unwanted fiber on the defibrated material.

In a conveyance device according to another aspect of the invention, the multiple rollers on which the endless belt is mounted include a first roller disposed on the conveyance path of the belt closest to the separation point where the defibrated material separates from the belt, and a second roller disposed downstream from the first roller in the conveyance direction of the belt; and the roller is disposed between the first roller and the second roller.

After the defibrated material separates from the belt, this configuration can quickly remove remaining fiber from the endless belt, and fiber is left on the endless belt for less time.

In a conveyance device according to another aspect of the invention, the roller is disposed on the side of the belt on which the defibrated material is deposited.

By disposing the roller on the side of the belt on which the defibrated material is placed, fiber clinging to the belt can be pushed out to and removed from the side on which the defibrated material is not carried.

In a conveyance device according to another aspect of the invention, the roller is disposed on the side of the belt on which the defibrated material is not deposited.

By disposing the roller on the side of the belt on which the defibrated material is not placed, fiber clinging to the belt can be pushed out to and removed from the side on which the defibrated material is carried.

In a conveyance device according to another aspect of the invention, the roller turns at a speed faster than the conveyance speed of the belt.

Because the roller turns at a speed faster than the conveyance speed of the belt, more fiber can be removed from the belt per unit time, and fiber can be removed from the belt more efficiently.

A conveyance device according to another aspect of the invention preferably also has a collection device configured to recover fiber from the belt; the collection device being disposed to a position opposite the roller with the belt therebetween, or a position downstream in the conveyance direction of the belt from the roller with the belt therebetween.

Because the collection device is located at a position opposite the roller, or a position downstream in the conveyance direction of the belt from the roller, fiber removed from the belt can be reliably recovered. Dispersion of fiber removed from the belt can also be prevented.

In a conveyance device according to another aspect of the invention, the collection device includes a collection roller configured rotatably and disposed in contact with the belt or a position with the protrusions protruding from the roller in contact with the belt; and the collection roller turns at a speed faster than the conveyance speed of the belt.

Because the collection roller turns at a speed faster than the conveyance speed of the belt, more fiber can be removed per unit time, and fiber removed from the belt can be recovered more efficiently.

In a conveyance device according to another aspect of the invention, the density of the protrusions disposed to the surface of the roller is greater than the density of the holes in the belt.

With this configuration, the protrusions can more reliably enter the holes in the belt, skewing of the belt can be better suppressed, and fiber can be more effectively removed from the belt.

In a conveyance device according to another aspect of the invention, the protrusions are fibers implanted to the surface of the roller; and the diameter of the protrusions is smaller than the holes in the belt.

Because the protrusions in this configuration are fibers implanted to the surface of the roller, a configuration that effectively removes fiber from the belt can be easily achieved.

Another aspect of the invention is a fibrous feedstock recycling device including: a defibrator that defibrates feedstock; a conveyance device that conveys defibrated material defibrated by the defibrator deposited on a belt having multiple holes; and a process unit that processes the defibrated material conveyed by the conveyance device. The conveyance device has a roller with numerous protrusions protruding from the surface and disposed in contact with the belt, and the sectional area of the protrusions of the roller is smaller than the open area of the holes in the belt, enabling the distal ends of the protrusions to penetrate the holes.

Because the sectional area of the protrusions of the roller is smaller than the open area of the holes in the belt, the distal ends of the protrusions protruding from the surface of the roller can penetrate the holes of the belt, and thereby effectively remove fiber from the belt. Furthermore, because the protrusions protruding from the surface of the roller can penetrate the holes of the belt, skewing of the belt can be suppressed.

Other objects and attainments together with a fuller understanding of the invention will become apparent and appreciated by referring to the following description and claims taken in conjunction with the accompanying drawings.

DESCRIPTION OF EMBODIMENTS

1. General Configuration of a Sheet Manufacturing Apparatus

Figure 1:
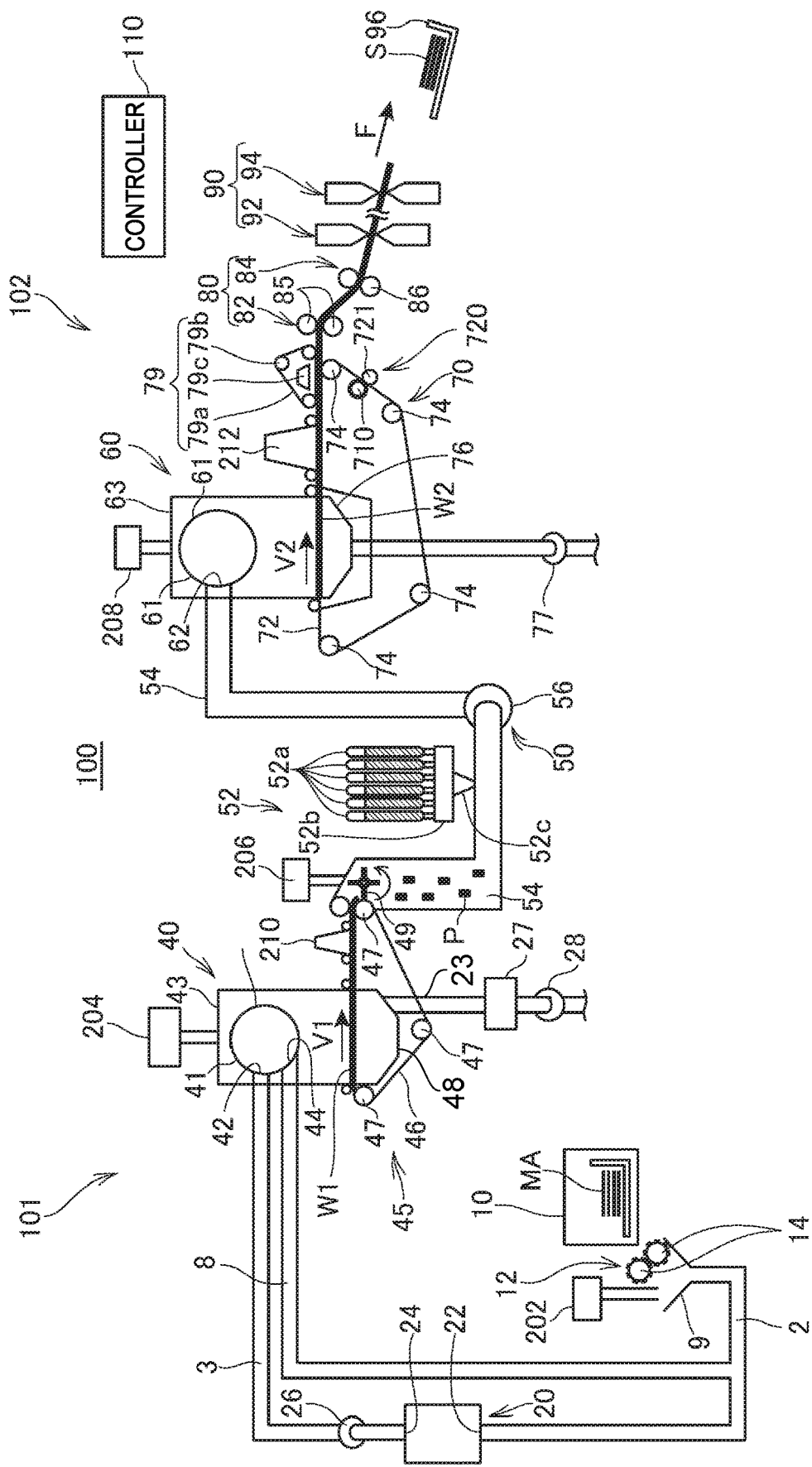
FIG. 1 illustrates the general configuration of a sheet manufacturing apparatus according to the invention.

FIG. 1 schematically illustrates the configuration of a sheet manufacturing apparatus 100 according to the invention.

The sheet manufacturing apparatus 100 according to the invention is an example of a fibrous feedstock recycling device, and executes a recycling process of defibrating feedstock containing fiber (fibrous feedstock) into individual fibers, and then making new sheets from the fiber material. The sheet manufacturing apparatus 100 manufactures various types of sheets by defibrating feedstock in a dry process into individual fibers, and then compressing, heating, and cutting. By mixing various additives to the defibrated material, the sheet manufacturing apparatus 100 can also improve the binding strength and whiteness of the sheet, and impart desirable characteristics such as color, scent, and flame resistance. By controlling the density, thickness, and form of the paper, the sheet manufacturing apparatus 100 can also produce various kinds of sheets. Examples of such sheets include A4 and A3 size office paper, cleaning sheets (such as sheets for sweeping floors), sheets for absorbing oil, and sheets for cleaning toilets, and molded sheet such as paper plates.

The sheet manufacturing apparatus 100 has a supply device 10, shredder 12, defibrator 20, classifier 40, first web former 45, rotor 49, mixing device 50, air-laying device 60 (accumulator), second web former 70, conveyance device 79, sheet forming device 80, and cutting device 90. The sheet manufacturing apparatus 100 also has a controller 110 that controls parts of the sheet manufacturing apparatus 100.

The sheet manufacturing apparatus 100 also has multiple wetting units (humidifiers) 202, 204, 206, 208, 210, 212 for wetting (humidifying) the feedstock, and/or wetting (humidifying) the spaces through which the feedstock travels. The specific configuration of the wetting devices 202, 204, 206, 208, 210, 212 may be designed as desired, and steam, evaporative, warm air vaporization, ultrasonic, or other type of humidification method may be used.

In this embodiment, wetting devices 202, 204, 206, 208 are evaporative or warm air vaporization humidifiers, have a filter (not shown in the figure) that is wetted with water, and supply humidified air with a high humidity level by passing air through the filter.

Wetting devices 210 and 212 are ultrasonic humidifiers, have a vibrator for atomizing water, and supplies the mist produced by the vibrator.

The supply device 10 supplies to the shredder 12 feedstock MA that the sheet manufacturing apparatus 100 recycles into sheets.

The feedstock MA is material containing fiber, and may be, for example, paper, pulp, pulp sheets, cloth, including nonwoven cloth, or textiles, for example. The feedstock of the sheet manufacturing apparatus 100 may be used paper, wastepaper, or other types of recovered paper, or unused (virgin) paper. The sheet manufacturing apparatus 100 described below uses recovered paper (including waste paper) as the feedstock.

The shredder 12 has a pair of shredder blades 14 that shred the feedstock MA supplied from the supply device 10 to between the shredder blades 14, and a chute (also referred to as a hopper) 9 that receives the paper shreds cut by and falling from the shredder blades 14. The shredder 12 shreds (cuts) the feedstock MA supplied from the supply device 10 in air by means of the shredder blades 14, producing coarse shreds. The shredder 12 in this example has the configuration of a common paper shredder, for example. The shape and size of the shreds is not specifically limited and is suitable to the defibrating process of the defibrator 20. In this example, the shredder 12 cuts the feedstock MA into shreds approximately one to several centimeters square or smaller.

The chute 9 has a tapered shape with a width that gradually narrows in the direction the shreds flow (the downstream direction), and connects to the defibrator 20. The shreds cut by the shredder blades 14 are collected through the chute 9 and conveyed (transported) through a conduit 2 to the defibrator 20.

Wet (humidified) air is supplied by a wetting device 202 into or near the chute 9 to suppress accretion of shreds inside the chute 9 or conduit 2 due to static electricity. Because the shreds are thus conveyed with humid air to the defibrator 20, accretion of defibrated material inside the defibrator 20 can also be expected. A configuration supplies humid air from the wetting device 202 to the shredder blades 14 to remove static from the feedstock MA, or an ionizer may be disposed as a static eliminator to the shredder 12 and defibrator 20.

The defibrator 20 defibrates the shreds produced by the shredder 12, and outputs defibrated material.

As used herein, defibrate means to break apart and detangle feedstock (in this example, shreds or other undefibrated fibrous material) composed of many fibers bonded together into single individual fibers. The defibrator 20 also has the ability to separate from the fibers various materials adhering to (bonded with) the feedstock, such as resin particles, ink toner, and bleeding inhibitors. The material that has past through the defibrator 20 is referred to as defibrated material.

In addition to defibrated fiber, the defibrated material may contain additives that are separated from the fiber during defibration, including resin (resin bonding multiple fibers together), ink, toner, and other color additives, bleeding inhibitors, and paper strengthening agents. The shape of the fiber in the defibrated material may be as strings or ribbons. The fiber contained in the defibrated material may be as individual fibers not intertwined with other fibers, or as clumps, which are multiple fibers tangled with other defibrated material into clumps.

The defibrator 20 defibrates in a dry process. A dry process as used herein means that the defibration process is done in air instead of a wet solution. The defibrator 20 uses an impeller mill in this example. More specifically, the defibrator 20 has a rotor (not shown in the figure) that turns at high speed, and a liner (not shown in the figure) positioned around the outside of the rotor. The shreds produced by the shredder 12 in this configuration go between the rotor and the liner of the defibrator 20 and are defibrated.

The defibrator 20 produces an air current by rotation of the rotor. By this air current the defibrator 20 suctions the shreds from the conduit 2, and conveys the defibrated material to the exit 24. The defibrated material is delivered from the exit 24 through another conduit 3 to the classifier 40.

The sheet manufacturing apparatus 100 also has a defibrator blower 26 as an air current generator. The defibrator blower 26 is disposed to the conduit 3, and suctions and pulls air with the defibrated material from the defibrator 20 to the classifier 40. The defibrated material is conveyed to the classifier 40 by the air current produced by the defibrator 20 and the air current produced by the defibrator blower 26.

The classifier 40 has an inlet 42, and defibrated material defibrated by the defibrator 20 flows from the conduit 3 with the air current into the inlet 42. The classifier 40 classifies the defibrated material introduced from the inlet 42 based on fiber length. More specifically, the classifier 40 separates the defibrated material defibrated by the defibrator 20 into first screened material consisting of defibrated material of a predetermined size or smaller, and second screened material consisting of defibrated material that is larger than the first screened material. The first screened material contains both fiber and particulate. The second screened material includes, for example, large fibers, undefibrated clumps (shreds that have not been sufficiently defibrated), and clumps of agglomerated or tangled defibrated threads.

The classifier 40 has a drum 41, and a housing 43 enclosing the drum 41.

The drum 41 is a cylindrical structure with a mesh, and the mesh may be a filter or a screen, for example. The mesh may be a metal screen, expanded metal made by expanding a metal sheet with slits formed therein, or punched metal having holes formed by a press in a metal sheet, for example. The drum 41 is driven rotationally by a motor (not shown in the figure), and functions as a sieve. By appropriately setting the size of the mesh, the drum 41 separates the defibrated material into first screened material that is smaller than the mesh openings, and second screened material that is larger than the mesh openings.

More specifically, by rotation of the drum 41, the first screened material passes through the mesh openings of the drum 41 and precipitates. The second screened material that cannot pass through the mesh of the drum 41 is carried to the exit 44 and pulled into the conduit 8 by the air current flowing from the inlet 42 to the drum 41.

The conduit 8 is connected between the inside of the drum 41 and conduit 2, and second screened material flowing from the drum 41 into the conduit 8 passes with the shreds from the shredder 12 through the conduit 2, and is carried into the inlet 22 of the defibrator 20. As a result, the second screened material is returned to the defibrator 20 and defibrated.

The first screened material selected by the drum 41 is dispersed in the air current, and precipitates onto the mesh belt 46 (belt, endless belt) of the first web former 45 located below the drum 41.

The first web former 45 includes a mesh belt 46, rollers 47, and suction device 48.

The mesh belt 46 is an endless belt, is tensioned by three tension rollers 47, and moves in the direction indicated by arrow V1 in the figure by operation of the tension rollers 47. The surface of the mesh belt 46 is configured by mesh with openings of a specific size. Of the first screened material that drops from the drum 41, particulate of a size that passes through the mesh drops from the mesh belt 46. Fiber of a size (fiber length) that is too large to pass through the mesh of the mesh belt 46 accumulates on the mesh belt 46, and is conveyed with the mesh belt 46 in the direction of arrow V1.

The particulate that drops from the mesh belt 46 includes impurities that are not suited to manufacturing sheets, including resin particulate, color agents, and other additives separated by the defibrator 20 from the shreds. These particles are waste that is not used in the production of new sheets (such as the sheets S shown in FIG. 1).

The defibrated material defibrated by the defibrator 20 is separated into first screened material and second screened material by the classifier 40 as described above, and the second screened material is returned to the defibrator 20. Waste material is also removed by the first web former 45 from the first screened material. The remnants of the first screened material after waste is removed is material suitable for making sheets S, and this material is then accumulated on the mesh belt 46 as a first web W1. This first web W1 is made from defibrated material defibrated by the defibrator 20.

The suction device 48 pulls air from below the mesh belt 46. The suction device 48 is connected through conduit 23 to a dust collector 27, and a collection blower 28 is disposed downstream from the dust collector 27. The collection blower 28 suctions air from the dust collector 27, and air the collection blower 28 discharges is expelled from the sheet manufacturing apparatus 100 through conduit 29.

The dust collector 27 is a filter-type or cyclonic dust collector, and separates particulate from the air current. Particulate suctioned with air through the mesh of the mesh belt 46 by the suction force of the collection blower 28 is captured by the dust collector 27. The collection blower 28 functions to quickly remove waste, and to promote formation of the first web W1 on the mesh belt 46.

Moist air is supplied by wetting device 204 to the space enclosing the drum 41. Wetting the first screened material by this moist air can be expected to have the effect of reducing accretion of first screened material on the mesh belt 46 due to static electricity, and facilitating separating the first web W1 from the mesh belt 46. Reducing accretion of first screened material by static electricity on the rotor 49 and the inside walls of the housing 43 can also be expected. In addition, more efficient removal of impurities by the suction device 48 can also be expected.

Note that the configuration in the sheet manufacturing apparatus 100 for screening and separating the first screened material and second screened material is not limited to a classifier 40 with a drum 41. For example, a configuration that uses a classifier to classify defibrated material defibrated by the defibrator 20 may be used. Examples of such a classifier include cyclone classifiers, elbow jet classifiers, and eddy classifiers. If such a classifier is used, the defibrated material can be selectively separated into first screened material and second screened material.

In addition, a configuration that separates and removes impurities including relatively small or low density matter (such as resin particles, color agents, and other additives) from the defibrated material can be configured by using such a classifier. This enables a configuration that, for example, removes particles contained in the first screened material from the first screened material by means of the classifier. In this case, the second screened material can be returned to the defibrator 20, the unwanted material can be collected by the dust collector 27, and first screened material from which impurities have been removed can be fed through conduit 54.

The configuration for removing unwanted material from the first screened material in the sheet manufacturing apparatus 100 is also not limited to a mesh belt 46, and configurations such as described above can be used.

Air carrying mist is supplied to the conveyance path of the mesh belt 46 by the wetting device 210 downstream from the classifier 40. The mist produced by the wetting device 210 descends toward the first web W1, supplying moisture to the first web W1. As a result, the moisture content of the first web W1 is adjusted and accretion of fiber to the mesh belt 46, for example, by static can be suppressed.

The rotor 49 detangles the fibers of the first web W1 into a form that can be easily mixed with resin by the mixing device 50 described below. The first web W1 is separated from the mesh belt 46 and broken up by the rotor 49 into shreds P at the position where the mesh belt 46 is returned to the upstream side by a roller 47. The rotor 49 may be configured as desired, and in this embodiment the rotor 49 has a rotor vane configuration of flat rotating blades. The shreds P are conveyed through a conduit 54 to the mixing device 50.

Humidified air is supplied by the wetting device 206 to the space containing the rotor 49, suppressing accretion of fiber on the rotor 49 or the inside of the conduit 54. Furthermore, because air with a high humidity level is supplied to the mixing device 50 through the conduit 54, the effects of static can also be suppressed in the mixing device 50.

The mixing device 50 has an additive supply device 52 that supplies an additive including resin, a conduit 54 that through which an air current carrying the shreds P flows, and a mixing blower 56, and mixes an additive including resin with the fiber (first screened material) in the shreds P.

One or more additive cartridges 52a storing additives are installed to the additive supply device 52. The additive cartridges 52a may be removably installed to the additive supply device 52. The additive supply device 52 includes an additive extractor 52b that extracts additive from the additive cartridges 52a, and an additive applicator 52c that discharges the additive extracted by the additive extractor 52b into the conduit 54.

The additive extractor 52b has a feeder (not shown in the figure) that feeds additive in a powder or particulate form from inside the additive cartridges 52a, and removes additive from some or all of the additive cartridges 52a. The additive removed by the additive extractor 52b is conveyed to the additive applicator 52c.

The additive applicator 52c holds the additive removed by the additive extractor 52b. The additive applicator 52c has a shutter (not shown in the figure) that opens and closes the connection to the conduit 54, and when the shutter is open, the additive extracted by the additive extractor 52b is fed into the conduit 54.

The shutter of the additive applicator 52c has the effect of preventing excessive additive from being suctioned from the additive supply device 52 by the negative pressure produced by the air flow through the conduit 54.

The additive that the additive supply device 52 supplies includes resin that melt and bind multiple fibers together when heated. The resin contained in the additive may be a thermoplastic resin or thermoset resin, such as AS resin, ABS resin, polypropylene, polyethylene, polyvinyl chloride, polystyrene, acrylic resin, polyester resin, polyethylene terephthalate, polyethylene ether, polyphenylene ether, polybutylene terephthalate, nylon, polyimide, polycarbonate, polyacetal, polyphenylene sulfide, and polyether ether ketone. These resins may be used individually or in a desirable combination. The additive may contain only a single material or a mixture, both of which may comprise multiple types of particulate comprising a single or multiple materials. The additive supplied may also be a fibrous or powder form.

In addition to resin for binding fibers, and depending on the type of sheet being manufactured, the additive supplied from the additive supply device 52 may also include a coloring agent for coloring the fiber, an anti-blocking agent to prevent agglomeration of fibers and agglomeration of resin, or a flame retardant for making the fiber difficult to burn, for example. The additive not containing a coloring agent may be colorless or a color light enough to be considered colorless, or white.

The types and numbers of additives the sheet manufacturing apparatus 100 uses are not specifically limited, and additive cartridges 52a corresponding to the types of additives used are installed to the additive supply device 52. The sheet manufacturing apparatus 100 may also use only some, or use all, of the additive cartridges 52a installed to the additive supply device 52.

In this example, six additive cartridges 52a are installed to the additive supply device 52. The six additive cartridges 52a include an additive cartridge 52a holding a colorless additive or an additive of a nearly-colorless pale color, and an additive cartridge 52a holding an additive that colors the fiber white. There are also additive cartridges 52a holding additives for coloring the fibers C (cyan), M (magenta), and Y (yellow).

The amount of additive the additive extractor 52b extracts from each of the additive cartridges 52a is controlled by the controller 110. By the controller 110 controlling the additive supply device 52, the sheet manufacturing apparatus 100 can operate to manufacture sheets S without coloring the fiber contained in the shreds P, and can operate to color the fiber used to manufacture sheets S. By supplying additive from any one of the color additive cartridges 52a, fibers can be colored white, cyan, magenta, or yellow. For example, whiteness can be improved by mixing fibers with white additive. Additive supplied from multiple additive cartridges 52a can also be mixed to produce fibers of desirably blended colors.

The additive supplied from the additive supply device 52 is conveyed through the conduit 54 and mixed with the fiber in the shreds P by the air current produced by the mixing blower 56, and passes through the mixing blower 56. The shreds P are detangled into individual fibers while flowing through conduit 54. The fibers in the shreds P and the additive from the additive supply device 52 are mixed by the air current produced by the mixing blower 56 and/or the action of the blades or other rotating members of the mixing blower 56, and the mixture is conveyed through the conduit 54 to the air-laying device 60.

The mechanism that mixes the first screened material and additive is not specifically limited, and may be configured by mixing with blades rotating at a high speed, a mechanism that uses rotation of the container, such as a V mixer, and the mixing mechanism may be disposed before or after the mixing blower 56.

The mixture that past the mixing device 50 is introduced from the inlet 62 to the air-laying device 60. The air-laying device 60 detangles and disperses the tangled defibrated material (fiber) in air, causing the mixture to fall onto the second web forming device 70. When the resin in the additive supplied from the additive supply device 52 is fibrous, the resin fibers are also detangled by the air-laying device 60 and fall onto the second web forming device 70.

The air-laying device 60 has a drum 61 and a housing 63 around the drum 61. The drum 61 is a cylindrical structure configured identically to the drum 41, has mesh like the drum 41, is driven rotationally by a motor, and functions as a sieve.

Note that the sieve of the drum 61 may be configured without functionality for selecting specific material. More specifically, the sieve used in the drum 61 means a device having mesh, and the drum 61 may cause all of the mixture introduced to the drum 61 to precipitate from the drum 61.

A second web forming device 70 (conveyance device) is disposed below the drum 61. The second web forming device 70 includes a mesh belt 72 (belt, endless belt), multiple rollers 74, a suction mechanism 76, and a collection device 720 including a brush roller 710 (rotor) and a collection roller 721. The brush roller 710 and collection device 720 are described below.

The mesh belt 72 is an endless belt, is tensioned by multiple rollers 74, and by operation of the tension rollers 74 is driven in the direction indicated by the arrow V2 in the figure. The mesh belt 72 may be metal, plastic, cloth, or nonwoven cloth. The surface of the mesh belt 72 is a screen with an array of openings of a specific size.

Of the fiber and particles dropping from the air-laying device 60, particles of a size that passes through the mesh drops through the mesh belt 72. Fiber of a size or fiber length that cannot pass through the openings in the mesh accumulates on the mesh belt 72 and is conveyed in the direction of arrow V2 with the mesh belt 72.

The mesh in the mesh belt 72 is fine, and is sized so that the majority of the fiber and particles that drop from the drum 61 cannot pass through the mesh belt 72. This configuration causes material that passes through the mesh of the drum 61 to accumulate in the second web forming device 70, and the accumulated material forms a second web W2. This second web W2 is the defibrated material that was defibrated by the defibrator 20.

The suction mechanism 76 includes a suction blower 77 disposed below the mesh belt 72, and by the suction of the suction blower 77 produces a flow of air in the suction mechanism 76 from the air-laying device 60 to the mesh belt 72.

The suction mechanism 76 pulls the mixture distributed in air by the air-laying device 60 onto the mesh belt 72, thereby promoting formation of a second web W2 on the mesh belt 72. The suction mechanism 76 also has the effect of increasing the discharge rate from the air-laying device 60, and by creating a downward air current in the path of mixture precipitation, can prevent interlocking of defibrated material and additive while descending to the mesh belt 72.

The suction blower 77 may be configured to pass air suctioned from the suction mechanism 76 through a collection filter not shown before being discharged to the outside of the sheet manufacturing apparatus 100. Alternatively, the suction blower 77 may push the suctioned air to the dust collector 27 to collect the impurities contained in the air suctioned by the suction mechanism 76.

Humidified air is supplied by the wetting device 208 to the space surrounding the drum 61. As a result, the inside of the air-laying device 60 can be humidified by the humidified air, fiber and particles accumulating on the housing 63 due to static electricity can be suppressed, fiber and particles can be made to fall quickly onto the mesh belt 72, and a second web W2 of a desired form can be made.

Air carrying mist is supplied by the wetting device 212 to the conveyance path of the mesh belt 72 on the downstream side of the air-laying device 60. As a result, the water content of the second web W2 can be adjusted, and accretion of fiber on the mesh belt 72 due to static electricity is also suppressed.

The second web W2 formed by the air-laying device 60 and second web forming device 70 is then separated from the mesh belt 72 and conveyed to the sheet forming device 80 by a conveyance device 79. The conveyance device 79 includes, for example, a mesh belt 79a, rollers 79b, and a suction mechanism 79c.

The suction mechanism 79c includes a blower (not shown in the figure), and by the suction force of the blower produces an upward air current on the mesh belt 79a. As a result of this air current, the second web W2 separates from the mesh belt 72 and is pulled to the mesh belt 79a. The mesh belt 79a moves in conjunction with the rollers 79b, and conveys the second web W2 to the sheet forming device 80.

The sheet forming device 80 binds fibers in the mixture through the resin contained in the additive by applying heat to the fiber and additive contained in the second web W2.

More specifically, the sheet forming device 80 has a compression device 82 that compresses the second web W2, and a heating device 84 that heats the second web W2 after the second web W2 is compressed by the compression device 82.

The compression device 82 in this example comprises a pair of calender rolls 85 that hold the second web W2 with a specific nipping force, compress the second web W2 to a high density, and convey the compressed second web W2 to the heating device 84.

The heating device 84 has a pair of heat rollers 86 which heat the second web W2 as it passes between the heat rollers 86 after being compressed by the calender rolls 85, forming a sheet S.

The cutting device 90 cuts the sheet S formed by the sheet forming device 80. In this example, the cutting device 90 has a first cutter 92 that cuts the sheet S crosswise to the conveyance direction of the sheet S indicated by the arrow F in the figure, and a second cutter 94 that cuts the sheet S parallel to the conveyance direction F. Single sheets of a specific size are formed by cutting the second web W2 in this way. The single sheets S cut by the cutting device 90 are then stored in the discharge tray 96. The discharge tray 96 may be a tray or stacker for holding the manufactured sheets, and the sheets S discharged to the tray can be removed and used by the user.

Parts of the sheet manufacturing apparatus 100 are configured as a defibration process unit 101 and recycling unit 102.

The defibration process unit 101 comprises at least the supply device 10 and defibrator 20, and may include the classifier 40 and first web former 45. The defibration process unit 101 produces defibrated material from the feedstock MA, or produces a first web W1 of defibrated material shaped like a web. The output product of the defibration process unit 101 may be removed from the sheet manufacturing apparatus 100 and stored without passing the rotor 49. The output product may also be sealed in specific packages, which may then be shipped and sold (marketed).

The recycling unit 102 is a functional unit that processes the product produced by the defibration process unit 101 into sheets S, includes the mixing device 50, second web forming device 70, conveyance device 79, sheet forming device 80, and cutting device 90, and may include the rotor 49. The recycling unit 102 may also include an additive supply device 52.

The sheet manufacturing apparatus 100 may also be configured with the defibration process unit 101 and recycling unit 102 in an integrated system, or as separate devices. In this case, the defibration process unit 101 is an example of a fibrous feedstock recycling device according to the invention. The recycling unit 102 is an example of a sheet forming device that processes defibrated material into sheets. Each of these components may also be conceived of as processing devices.

2. Control System Configuration of the Sheet Manufacturing Apparatus

Figure 2:
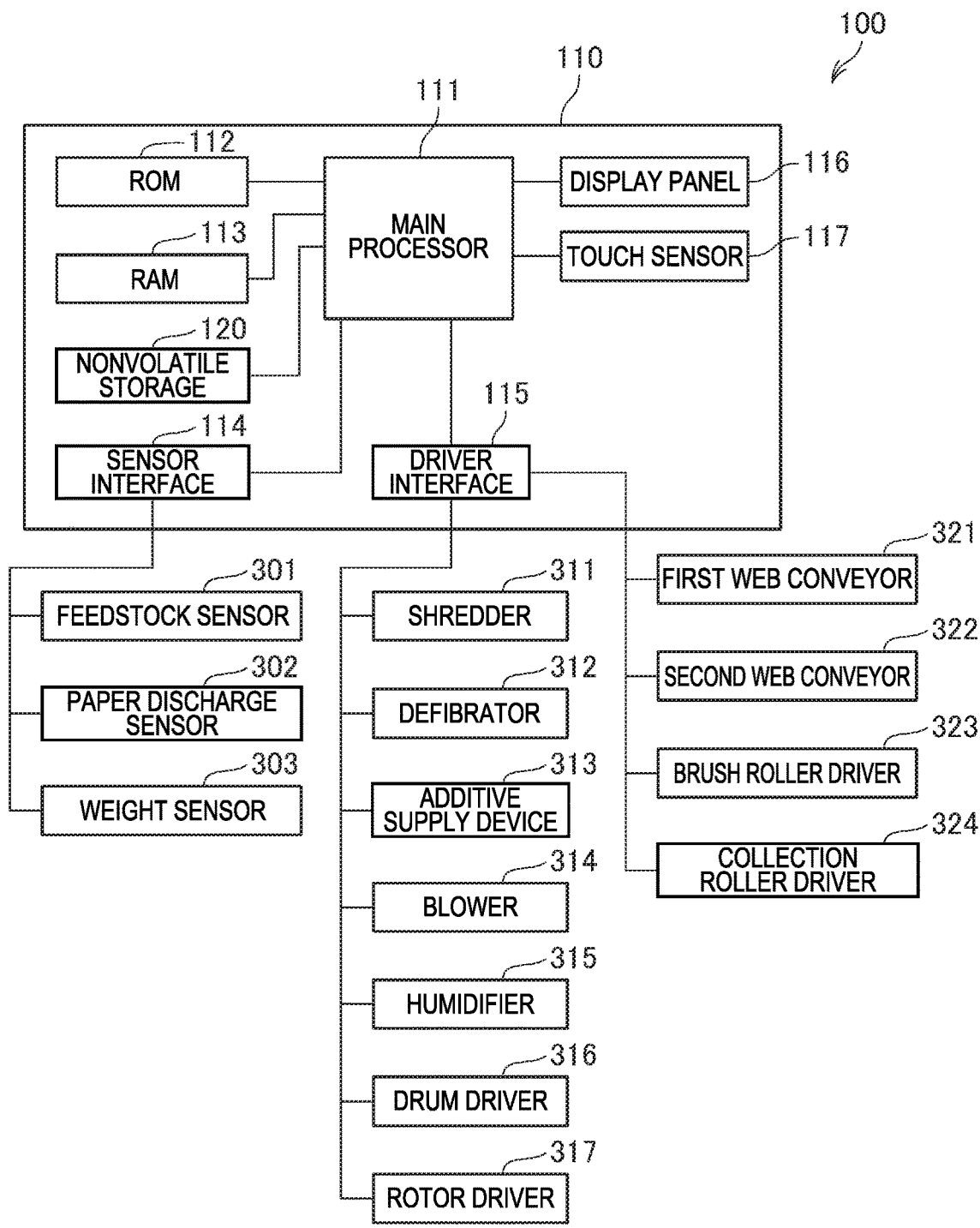
FIG. 2 is block diagram illustrating the configuration of the control system of the sheet manufacturing apparatus 100.

FIG. 2 is a block diagram of the configuration of the control system of the sheet manufacturing apparatus 100.

The sheet manufacturing apparatus 100 has a controller 110 including a main processor 111 for controlling parts of the sheet manufacturing apparatus 100.

The controller 110 includes the main processor 111, ROM (Read Only Memory) 112, and RAM (Random Access Memory) 113.

The main processor 111 is embodied by a processor such as a CPU (central processing unit), and controls parts of the sheet manufacturing apparatus 100 by running a basic control program stored in ROM 112. The main processor 111 may also be configured as a system chip including ROM 112, RAM 113, or other peripheral circuits, or other IP cores.

ROM 112 nonvolatilely stores programs executed by the main processor 111.

RAM 113 provides working memory used by the main processor 111, and temporarily stores programs the main processor 111 runs and data that is processed.

Nonvolatile storage 120 stores programs the main processor 111 executes, and data the main processor 111 processes.

The display panel 116 is an LCD or other type of display panel, and in this example is disposed externally to the sheet manufacturing apparatus 100. The display panel 116 displays the operating status of the sheet manufacturing apparatus 100, various settings, and warnings, for example.

The touch sensor 117 is a touch or pressure sensitive sensor. In this example, the touch sensor 117 is disposed over the display surface of the display panel 116, and detects operations on the display panel 116. In response to operations, the touch sensor 117 outputs to the main processor 111 operating data including the operating position and the number of operating positions. Based on output from the touch sensor 117, the main processor 111 detects operation of the display panel 116, and acquires the operating positions. The main processor 111 enables GUI (graphical user interface) operations based on the operating position detected by the touch sensor 117, and the display data 122 that was displayed on the display panel 116 when the operation was detected.

The controller 110 is connected through a sensor interface 114 to sensors disposed to parts of the sheet manufacturing apparatus 100. The sensor interface 114 is an interface that acquires detection values output by the sensors, and inputs to the main processor 111. The sensor interface 114 may include an A/D converter that converts analog signals output by the sensors to digital data. The sensor interface 114 may also supply drive current to the sensors. The sensor interface 114 may also include circuits that acquire sensor output values according to the sampling frequency controlled by the main processor 111, and output to the main processor 111.

The sensor interface 114 is also connected to a feedstock sensor 301, paper discharge sensor 302, and weight sensor 303.

The feedstock sensor 301 detects the remaining amount of feedstock MA in the supply device 10. The feedstock sensor 301 may be an optical sensor that detects when the feedstock MA stored in a stocker reaches the top of the stocker, for example. When the controller 110 determines, based on the output of the feedstock sensor 301, that the amount of feedstock MA is greater than or equal to a set amount, the controller 110 outputs a signal to not load feedstock MA from the loader opening.

The paper discharge sensor driver 302 detects how many sheets S are stored in the tray or stacker of the tray 96. The controller 110 reports when the volume of sheets S detected by the paper discharge sensor 302 is greater than or equal to a specific setting.

The weight sensor 303 is a sensor inside a scale, and detects or measures the weight of the feedstock MA placed or accumulated in a holding unit.

The controller 110 is connected to the drivers of the sheet manufacturing apparatus 100 through a driver interface 115. The drivers of the sheet manufacturing apparatus 100 include motors, pumps, and heaters, for example. The driver interface 115 may be a configuration directly connected to a motor, or connected to drive circuit or drive chip (IC chip) that supplies drive current to a motor.

A shredder 311, defibrator 312, additive supply device 313, blower 314, humidifier 315, drum driver 316, and rotor driver 317.

The shredder 311 includes a motor or other drive device for turning the shredder blades 14.

The defibrator 312 includes a motor or other drive device for turning the rotor (not shown in the figure) of the defibrator 20.

The additive supply device 313 includes drivers such as a motor that drives a screw feeder for supplying additive from the additive cartridges 52a, and a motor or actuator that opens and closes the shutters of the additive cartridges 52a.

The blowers 314 include the defibrator blower 26, collection blower 28, mixing blower 56, and suction blower 77. These blowers are individually connected to the driver interface 115.

The drum driver 316 includes drivers such as a motor for turning drum 41, and a motor for turning drum 61.

The rotor driver 317 includes a driver such as a motor for turning the rotor 49.

A motor for driving the calender rolls 85, and a heater for heating the heat rollers 86, may also be connected to the driver interface 115. A water pump for supply water to the humidifiers (wetting devices) may also be connected to the driver interface 115.

Also connected to the driver interface 115 are a first web conveyor 321, second web conveyor 322, brush roller driver 323, and collection roller driver 324.

The first web conveyor 321 includes a motor for driving the rollers 47 that turn the mesh belt 46, and a power transfer mechanism that transfers power from the motor to the rollers 47.

The second web conveyor 322 includes a motor for driving the rollers 74 that turn the mesh belt 72, and a power transfer mechanism that transfers power from the motor to the rollers 74.

The brush roller driver 323 includes a motor for rotationally driving the brush roller 710, and a power transfer mechanism that transfers power from the motor to the brush roller 710.

The collection roller driver 324 includes a motor for rotationally driving the collection roller 721, and a power transfer mechanism that transfers power from the motor to the collection roller 721.

3. Configuration of the Second Web Former

Figure 3:
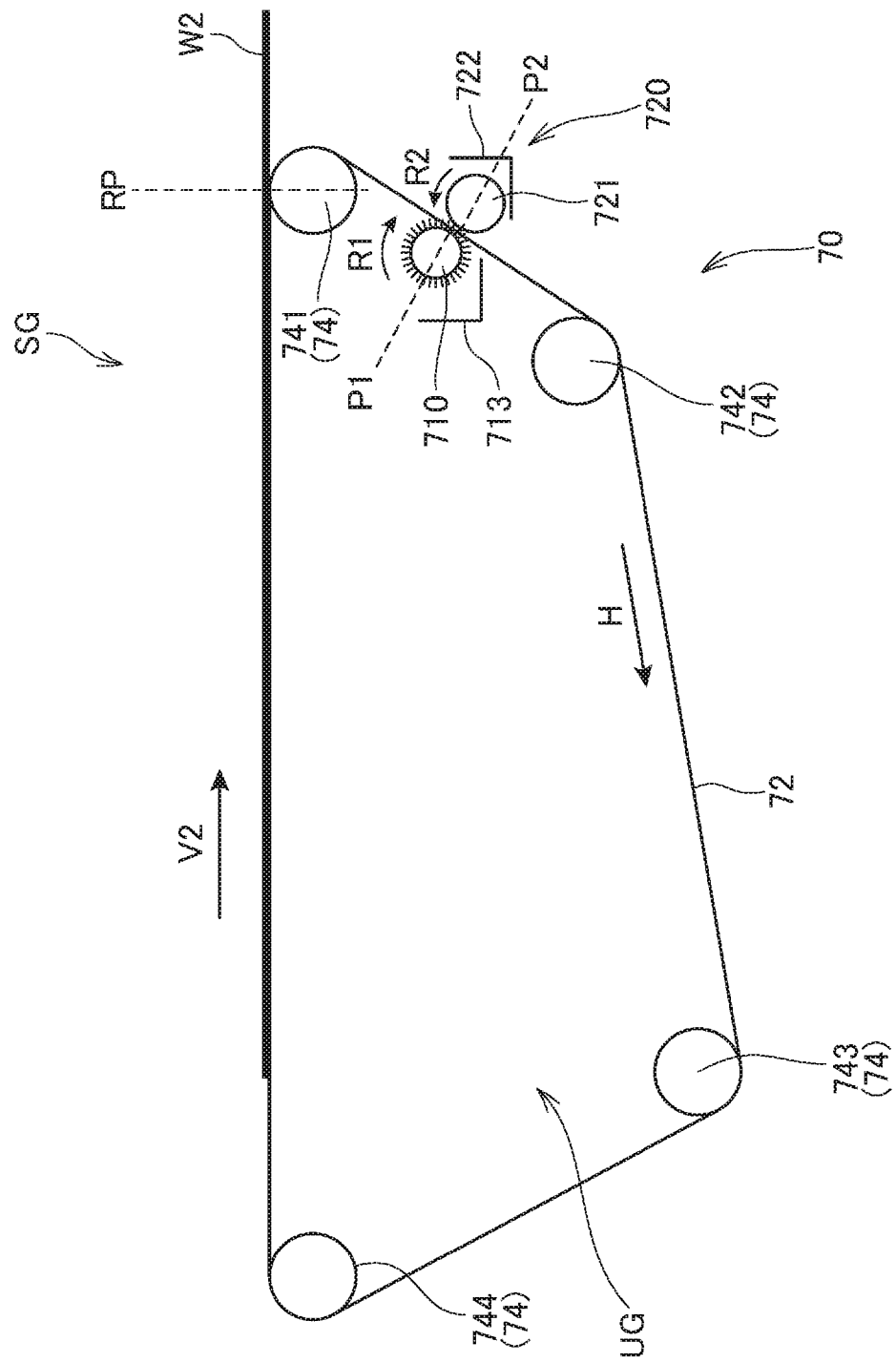
FIG. 3 illustrates the configuration of a second web former.

FIG. 3 illustrates the configuration of the second web former 70.

The mesh belt 72 travels around four tension rollers 74, first roller 741, second roller 742, third roller 743, and fourth roller 744. The mesh belt 72 circulates to convey the second web W2 formed on the surface of the mesh belt 72 in the direction of arrow V2 by at least one or the first roller 741 to fourth roller 744 driving clockwise. The surface of the mesh belt 72 is the surface on which the second web W2 is laid.

The first roller 741 is disposed closer to the point of separation RP than any of the second roller 742 to fourth roller 744.

The point of separation RP is the position on the conveyance path of the mesh belt 72 that the second web W2 separates from the mesh belt 72. The second roller 742 is disposed downstream from the first roller 741 in the conveyance direction of the mesh belt 72 indicated by the arrow H in the figure. The third roller 743 is disposed downstream from the second roller 742 in the conveyance direction H of the mesh belt 72. The fourth roller 744 is disposed downstream from the third roller 743 in the conveyance direction H of the mesh belt 72.

Between the first roller 741 and second roller 742 is a brush roller 710. The brush roller 710 is disposed in contact with the back side of the mesh belt 72 on the inside UG of the mesh belt 72. The inside UG of the mesh belt 72 is the side on which the second web W2 is not laid (the side on which the defibrated material is not deposited). The back side of the mesh belt 72 is the side on which the second web W2 is not laid, and is the side of the mesh belt 72 that contacts the tension rollers 74.

The brush roller 710 turns as controlled by the controller 110 in the direction of rotation indicated by the arrow R1 (that is, clockwise), or turns freely in conjunction with movement of the mesh belt 72, and removes fiber from the mesh belt 72 after the second web W2 has been separated from the mesh belt 72.

Figure 4:
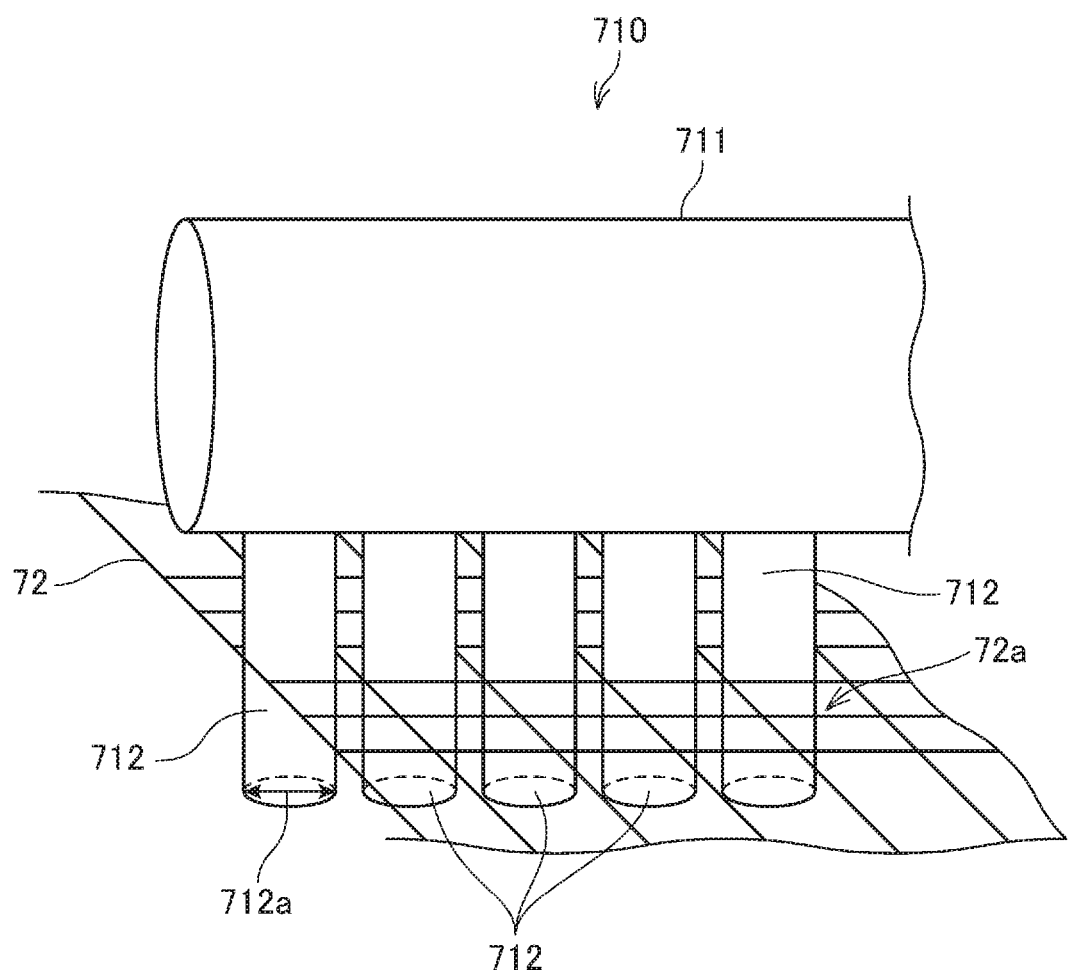
FIG. 4 illustrates the main part of a brush roller.

FIG. 4 illustrates the configuration of the brush roller 710.

The brush roller 710 includes a cylindrical roll 711 extending in a direction intersecting (for example, perpendicular to) the conveyance direction of the mesh belt 72, and multiple bristles 712 protruding from the outside surface of the roll 711.

The bristles 712 in this example synthetic fibers of nylon or polyester, and are implanted in lines protruding from the outside surface of the roll 711 by surface processing technology such as electrostatic flocking. The size of the bristles 712 is configured to be smaller than the mesh 72a in the mesh belt 72. In this embodiment, the size of the bristles 712 indicates the diameter 712a of the bristles 712. The diameter 712a of the bristles 712 in this embodiment is therefore smaller than the mesh 72a in the mesh belt 72. For example, if the diameter 712a of the bristles 712 is 0.1 mm, the distance between opposite sides of the mesh 72a is 0.2 mm when the mesh 72a is rectangular. More specifically, the diameter 712a of the bristles 712 is smaller than the length of any two adjacent sides of the mesh 72a. This means that the sectional area of the bristles 712 in section (the section in the direction perpendicular to the direction the bristles 712 protruded from the roll 711) is smaller than the open area of the mesh 72a.

Because the size of the bristles 712 of the brush roller 710 is smaller than the openings in the mesh belt 72, the bristles 712 can enter the mesh 72a in the mesh belt 72. As a result, the brush roller 710 can push fiber sticking in the mesh 72a of the mesh belt 72 through the mesh 72a and effectively remove the fiber from the mesh belt 72. Furthermore, because the bristles 712 enter the mesh 72a in the mesh belt 72, the brush roller 710 can suppress skewing of the mesh belt 72 in the conveyance direction H.

Furthermore, because fiber can be effectively removed from the mesh belt 72, the second web former 70 can repeatedly convey the second web W2 while preventing adhesion of unwanted fiber to the second web W2 conveyed by the endless mesh belt 72. Because unwanted fiber can be prevented from sticking to the second web W2, the sheet manufacturing apparatus 100 can prevent variation in the thickness of the second web W2 by adhesion of the unwanted fiber, and can make sheets S with a desired thickness.

Multiple bristles 712 are disposed to the surface of the roll 711 at a higher density than the density of the mesh 72a in the mesh belt 72. The multiple bristles 712 are disposed at a higher density than the density of the mesh 72a in the mesh belt 72 at least in the direction the roll 711 extends. The bristles 712 may also be disposed at the same density in the circumferential direction of the roll 711.

For example, the mesh 72a of the mesh belt 72 may be formed at a density of 80 per inch in the direction the roll 711 extends, and the bristles 712 may be disposed in the surface of the roll 711 at a density of 300 per inch in the direction the roll 711 extends. By thus more reliably causing the bristles 712 to penetrate the mesh 72a of the mesh belt 72, fiber can be more effectively removed from the mesh belt 72, and skewing of the mesh belt 72 can be more effectively prevented.

AS described above, the brush roller 710 turns in the direction of arrow R1 as controlled by the controller 110, or turns freely in conjunction with movement of the mesh belt 72, and removes remaining fiber from the mesh belt 72 after the second web W2 is removed. When turning as controlled by the controller 110, the brush roller 710 preferably turns at a faster speed than the speed of mesh belt 72 in the direction of conveyance direction H. Note that the speed of rotation indicates the number of revolutions per unit time, and is equivalent to the speed the roll 711 turns in conjunction with rotation of the brush roller 710. As a result, the brush roller 710 can remove more fiber per unit time from the mesh belt 72, and the efficiency of fiber removal can be improved.

In FIG. 4, the shape of the bristles 712 in section (the section in the direction perpendicular to the direction the bristles 712 protruded from the roll 711) is round, but may be oval, triangular, or rectangular. If the bristles 712 are oval in section, the size of the bristles 712 indicates the length of the long axis of the oval. If the shape of the bristles 712 in section is polygonal, the size of the bristles 712 indicates the greatest distance in the sectional direction between any two sides, any two corners, or any side and any corner.

Also in FIG. 4 the mesh belt 72 is shown as a configuration with numerous rectangular mesh 72a, but the shape of the mesh 72a is not limited to rectangular, and may be round or triangular. In addition, FIG. 4 shows an example of a mesh belt 72 having numerous mesh 72a in a grid array, but the arrangement of the numerous mesh 72a is not limited to a rectangular grid.

In this case, the maximum length of the bristles 712 in section (the length that is greatest in the section of the bristles 712) is set smaller than the maximum length (the maximum length across the opening) of the mesh 72a of the mesh belt 72 in the same direction, and the sectional area of the bristles 712 (the area of the section) is smaller than the open area of the mesh 72a of the mesh belt 72. In other words, the shape of the bristles 712 in section (the section in the direction perpendicular to the direction the bristles 712 protrude from the roll 711) is set to a size contained within (without protruding from) the shape (open area) of the mesh 72a of the mesh belt 72. As a result, when the brush roller 710 with the bristles 712 contacts the mesh belt 72, the distal ends of the bristles 712 can reliably enter and pass through the mesh 72a of the mesh belt 72.

More particularly, when the sectional shape of the roll 711 is round as shown in FIG. 4, the maximum sectional length of the bristles 712 (the length of the greatest diameter across the section of the bristles 712) is set smaller than the length in the same direction across the mesh 72a of the mesh belt 72 (the direction perpendicular to the direction the roll 711 protrudes from the bristles 712), and the area of the section (that is, the sectional area) of the bristles 712 is smaller than the open area of the mesh 72a in the mesh belt 72. In other words, the shape of bristles 712 in section (the section in the direction perpendicular to the direction the bristles 712 protrude from the roll 711) is set to a diameter and sectional area that fit inside, without protruding from, the shape (shape of the openings) of the mesh 72a [sic] in the mesh belt 72. As a result, the sectional shape of the bristles 712 is designed to cover and be completely surrounded by openings in the mesh belt 72. As a result, when the brush roller 710 with bristles 712 contacts the mesh belt 72, the distal ends of the bristles 712 reliably enter and pass through the mesh 72a in the mesh belt 72.

Returning to FIG. 3, a receiver 713 is disposed between the first roller 741 and second roller 742 on the inside UG of the mesh belt 72 and downstream in the conveyance direction H of the mesh belt 72 from the brush roller 710.

The receiver 713 is configured to receive from the brush roller 710 any fiber removed on the inside UG of the mesh belt 72. The specific configuration of the receiver 713 may be determined as desired, and in this example is embodied as a chute that receives fiber falling from the brush roller 710. By providing a receiver 713, fiber that is removed on the inside UG of the mesh belt 72 can be prevented from dispersing inside the sheet manufacturing apparatus 100 and sticking to other parts in the sheet manufacturing apparatus 100.

Between the first roller 741 and second roller 742 on the outside SG of the mesh belt 72 is disposed a collection device 720. The outside SG of the mesh belt 72 is the side on which the second web W2 is carried by the mesh belt 72 (the side on which defibrated material is deposited. The collection device 720 includes a collection roller 721 and receiver 722.

The collection roller 721 is a cylindrical roller extending in a direction intersecting (such as perpendicular) the conveyance direction H of the mesh belt 72. The collection roller 721 is disposed at position P2 in contact with the mesh belt 72 or the bristles 712 of the brush roller 710 exposed through the mesh belt 72. The position P2 is a position opposite or downstream in the conveyance direction H of the mesh belt 72 from the position P1 where the brush roller 710 contacts the mesh belt 72. The collection roller 721 turns in the direction of rotation indicated by arrow R2 (that is, counterclockwise) as controlled by the controller 110, and collects fiber removed from the mesh belt 72. The collection roller 721 is a member with the surface covered by sponge or other soft material, and collects fiber removed from the mesh belt 72 without deforming or damaging the bristles 712 when in contact with the bristles 712.

The speed of the collection roller 721 rotation is preferably greater than the conveyance speed of the mesh belt 72 in the conveyance direction H. This rotational speed indicates the number of revolutions per unit time, and is equivalent to the surface velocity of the collection roller 721 when turning. As a result, the collection roller 721 can increase the amount of fiber collected per unit time from the mesh belt 72, and can improve the collection efficiency of fiber removed from the mesh belt 72.

Note that the collection roller 721 being disposed to position P2 is equivalent to the collection device 720 being disposed to the position P2.

The receiver 722 is disposed on the outside SG of the mesh belt 72 between the first roller 741 and second roller 742, downstream from the collection roller 721 in the conveyance direction H of the mesh belt 72. The receiver 722 is configured to receive fiber collected by the collection roller 721. The receiver 722 may be configured as desired, such as by a chute that receives fiber dropping from the collection roller 721.

The collection device 720 is disposed opposite the brush roller 710 with the mesh belt 72 therebetween, or downstream from the brush roller 710 in the conveyance direction H of the mesh belt 72. As a result, the collection device 720 can reliably collect fiber removed by the brush roller 710 from the mesh belt 72.

As described in FIG. 3 above, the brush roller 710 is disposed on the inside UG of the mesh belt 72, and the collection device 720 is disposed on the outside SG of the mesh belt 72. As a result, the brush roller 710 can remove fiber sticking to the mesh belt 72 from the outside SG of the mesh belt 72. The collection device 720 can also collect the fiber removed on the outside SG of the mesh belt 72.

The second web W2 is carried on the surface of the mesh belt 72. As a result, fiber can stick to the top side of the mesh belt 72 more easily than the bottom (back) side of the mesh belt 72. The brush roller 710 is therefore disposed on the inside UG of the mesh belt 72 so that the bristles 712 can push through the mesh 72a to the outside SG of the mesh belt 72.

The second web former 70 can therefore prevent fiber sticking to the surface of the mesh belt 72 from filling the mesh 72a, and can effectively remove fiber sticking to the mesh belt 72.

The brush roller 710 and collection device 720 are disposed between the first roller 741 and second roller 742. As a result, after the second web W2 separates from the mesh belt 72, the brush roller 710 can quickly remove remaining fiber from the mesh belt 72, and can shorten the time fiber sticks to the mesh belt 72. The collection roller 721 can also quickly collect fiber removed from the mesh belt 72 after the second web W2 separates. Because fiber can be quickly removed and collected from the mesh belt 72 after the second web W2 separates, fiber clinging to the mesh belt 72 can be prevented from dispersing inside the sheet manufacturing apparatus 100, and fiber clinging to the mesh belt 72 can be prevented from accreting on other parts of the sheet manufacturing apparatus 100.

Several variations of the second web former 70 are described below.

4. Configuration of the Second Web Former According to a First Variation

Figure 5:
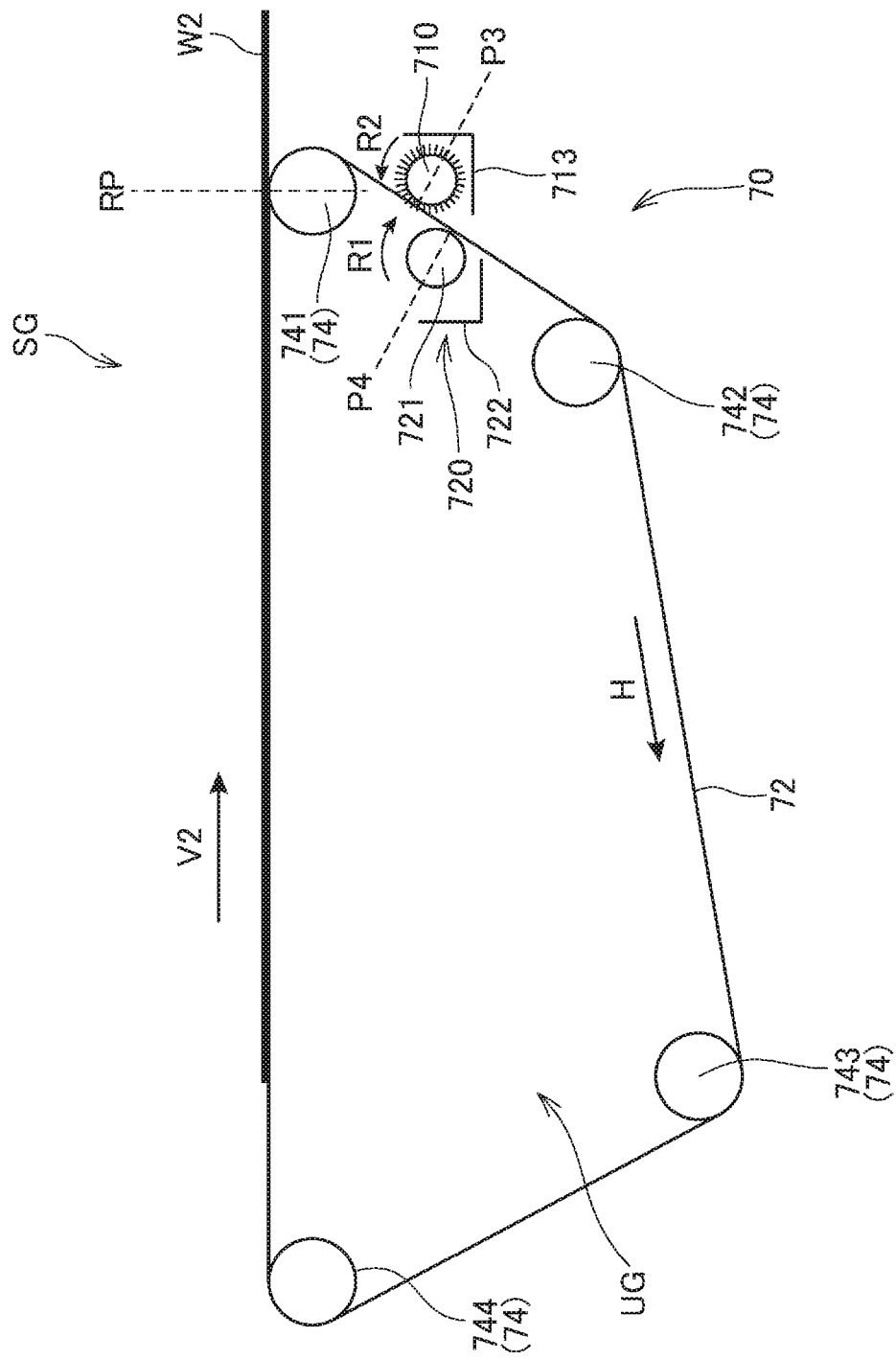
FIG. 5 illustrates the configuration of a second web former according to a first variation.

FIG. 5 illustrates the configuration of main parts of a second web former 70 according to a first variation.

In the following description of a second web former 70 according to a first variation as shown in FIG. 5, like parts in this and the second web former 70 shown in FIG. 3 are identified by like reference numerals, and further detailed description is omitted or simplified.

As will be understood by comparing FIG. 5 and FIG. 3, the second web former 70 according to this first variation has the brush roller 710 disposed on the outside SG of the mesh belt 72, and the collection device 720 is disposed on the inside UG.

More specifically, the brush roller 710 is disposed in contact with the mesh belt 72 between the first roller 741 and second roller 742 on the outside SG of the mesh belt 72. The brush roller 710 in this first variation turns in the direction of arrow R2 as controlled by the controller 110, or turns freely in conjunction with movement of the mesh belt 72, and removes fiber from the mesh belt 72 after the second web W2 separates from the mesh belt 72.

The collection roller 721 of the collection device 720 contacts the mesh belt 72 at a position P4 on the inside UG of the mesh belt 72 between the first roller 741 and second roller 742. This position P4 is opposite or downstream in the conveyance direction H of the mesh belt 72 from the position P3 where the brush roller 710 contacts the mesh belt 72. The collection roller 721 turns in the direction of rotation indicated by arrow R1 as controlled by the controller 110, and collects fiber removed from the mesh belt 72.

As described above, the second web former 70 according to the first variation has the brush roller 710 disposed on the outside SG of the mesh belt 72, and the collection device 720 disposed on the inside UG of the mesh belt 72. As a result, the brush roller 710 can remove fiber sticking to the mesh belt 72 on the outside SG of the mesh belt 72. The collection device 720 can then collect the fiber that was removed on the outside SG of the mesh belt 72.

Fibers of various lengths may remain on the mesh belt 72. The length of the remaining fibers is an average of approximately 0.8 mm with long fibers of approximately 1.5 mm. The shorter the fibers, they more easily the fibers stick in the mesh 72a and the back surface of the mesh belt 72. By disposing the brush roller 710 on the outside side of the mesh belt 72, the bristles 712 can push through the mesh 72a to the inside UG side of the mesh belt 72, and the second web former 70 can effectively remove fiber sticking to the mesh belt 72 even when the fibers are short.

5. Configuration of the Second Web Former According to a Second Variation

Figure 6:
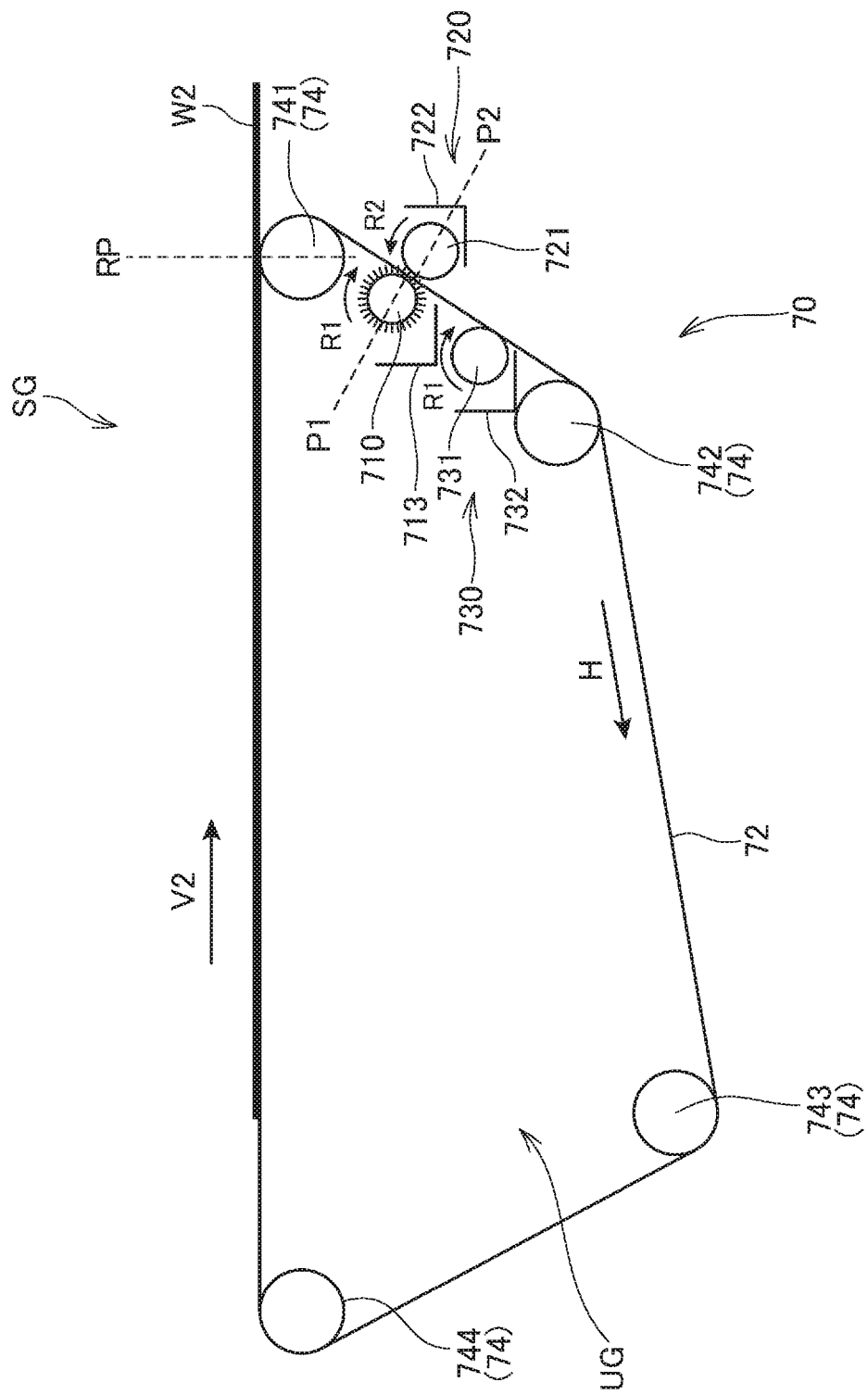
FIG. 6 illustrates the configuration of a second web former according to a second variation.

FIG. 6 illustrates the configuration of main parts of a second web former 70 according to a second variation.

In the following description of a second web former 70 according to a second variation as shown in FIG. 6, like parts in this and the second web former 70 shown in FIG. 3 are identified by like reference numerals, and further detailed description is omitted or simplified.

As will be understood by comparing FIG. 6 and FIG. 3, the second web former 70 according to this second variation has an additional collection device 730.

The collection device 730 is disposed between the first roller 741 and second roller 742 on the inside UG of the mesh belt 72, and downstream in the conveyance direction H of the mesh belt 72 from the brush roller 710. The collection device 730 has a collection roller 731 and a receiver 732.

The collection roller 731 is a cylindrical roller extending in a direction intersecting (such as perpendicular) the conveyance direction H of the mesh belt 72, and rotates in the direction of arrow R1. The collection roller 731 is disposed in contact with the back side of the mesh belt 72. Like collection roller 721 described above, collection roller 731 may be a member with the surface covered by sponge or other soft material. The collection roller 731 turns as controlled by the controller 110 in the direction of arrow R1, and recovers fiber removed from the back side of the mesh belt 72.

The receiver 732 is disposed between the first roller 741 and second roller 742 on the inside UG of the mesh belt 72, and downstream in the conveyance direction H of the mesh belt 72 from the collection roller 731. The receiver 732 is configured to receive fiber collected by the collection roller 731. The receiver 732 may be configured as desired, such as by a chute that receives fiber dropping from the brush roller 710.

As described above, the second web former 70 according to the second variation is disposed between the first roller 741 and the second roller 742 on the inside UG side of the mesh belt 72, and has an additional collection device 730 disposed downstream in the conveyance direction H of the mesh belt 72 from the brush roller 710. As a result, fiber wiped from the back side of the mesh belt 72 by the brush roller 710 can be collected by the collection device 730, and remaining fiber can be more effectively removed from the mesh belt 72.

As described above, the second web former 70 (conveyance device) forms and conveys a second web W2 (defibrated material) including fiber on a mesh belt 72 (belt) having numerous openings 72a. The second web former 70 also has a brush roller 710 (roller) that contacts the mesh belt 72 with numerous bristles 712 protruding from the roller surface. The sectional area of the bristles 712 of the brush roller 710 is set smaller than the open area of the mesh 72a (openings) in the mesh belt 72 so that the distal ends of the bristles 712 can enter the mesh 72a (openings).

By setting the sectional area of the bristles 712 of the brush roller 710 smaller than the open area of the mesh 72a (openings) in the mesh belt 72, the bristles 712 can enter the openings of the mesh 72a of the mesh belt 72. As a result, the second web former 70 push fibers clinging to the mesh 72*a* of the mesh belt 72 out of the mesh 72*a*, and fiber can be more effectively removed from the mesh belt 72. In addition, because the bristles 712 protruding from the surface of the brush roller 710 penetrate the mesh 72*a* of the mesh belt 72, the second web former 70 can also suppress skewing of the mesh belt 72.

The plane shape of the bristles 712 in section (round in the example in FIG. 4) is set to a size that fits inside the shape of the openings in the mesh 72*a* of the mesh belt 72 (square in FIG. 4).

Thus comprised, when the brush roller 710 with bristles 712 contacts the mesh belt 72, the distal ends of the bristles 712 can reliably penetrate the mesh 72*a* of the mesh belt 72, and effectively remove fiber from the mesh belt 72.

The mesh belt 72 (endless belt) is a belt that travels in a loop around multiple rollers 74.

This configuration enables the second web former 70 to continuously convey a second web W2 while preventing inclusion of unnecessary (unwanted) fiber on the second web W2.

The multiple rollers 74 on which the 72 is mounted include a first roller 741 disposed on the conveyance path of the mesh belt 72 closest to the point of separation RP where the second web W2 separates from the mesh belt 72, and a second roller 742 located downstream in the conveyance direction H of the mesh belt 72 from the first roller 741. The brush roller 710 is disposed btw the first roller 741 and second roller 742.

This configuration enables the second web former 70 to quickly remove fiber from the mesh belt 72 after the second web W2 separates from the mesh belt 72, and can shorten the time that fiber remains on the mesh belt 72.

The brush roller 710 is also disposed on the outside SG side of the mesh belt 72 (the side on which the defibrated material is deposited).

This configuration enables the second web former 70 to push and remove fiber left on the mesh belt 72 to the inside UG of the mesh belt 72. More specifically, even when short fibers that cling easily to the back side of the mesh 72*a* and mesh belt 72 remain on the mesh belt 72, the second web former 70 thus comprised can effectively remove the fibers.

The brush roller 710 is disposed on the inside UG side of the mesh belt 72 (the side on which the defibrated material is not placed).

Thus comprised, the second web former 70 can push and remove fiber clinging to the mesh belt 72 to the outside SG of the mesh belt 72. As described above, because the second web W2 is formed on the (outside) surface of the mesh belt 72, fiber clings more easily on the outside surface of the mesh belt 72 than the back side (inside) of the mesh belt 72. The brush roller 710 is therefore disposed on the inside UG of the mesh belt 72 so that the bristles 712 push through the mesh 72*a* to the outside SG of the mesh belt 72. As a result, the second web former 70 can prevent fiber on the outside surface of the mesh belt 72 from entering the mesh 72*a*, and can more effectively remove fiber that is clinging to the mesh belt 72.

The brush roller 710 also turns at a faster speed than the conveyance speed of the mesh belt 72.

By driving the brush roller 710 at a higher speed of rotation than the conveyance speed of the mesh belt 72, the second web former 70 can remove more fiber per unit time from the mesh belt 72, and can more efficiently remove fiber from the mesh belt 72.

The second web former 70 also has a collection device 720 that collects the fiber removed from the mesh belt 72.

The collection device 720 is disposed to a position opposite the brush roller 710 with the mesh belt 72 therebetween, or a position downstream in the conveyance direction H of the mesh belt 72 from the brush roller 710 with the mesh belt 72 therebetween.

The second web former 70 in this configuration can reliably recover fiber removed from the mesh belt 72 because a collection device 720 is disposed opposite the brush roller 710 or downstream in the conveyance direction H of the mesh belt 72 from the brush roller 710. By the collection device 720 recovering fiber, the second web former 70 can prevent fiber removed from the mesh belt 72 from dispersing inside the sheet manufacturing apparatus 100.

The collection device 720 has a collection roller 721 that is disposed rotatably, and contacts the mesh belt 72 or with protruding bristles 712 in contact with the mesh belt 72. The collection roller 721 also turns at a higher speed than the conveyance speed of the mesh belt 72.

Because the collection roller 721 also turns at a higher speed than the conveyance speed of the mesh belt 72, the second web former 70 can remove more fiber per unit time from the mesh belt 72, and can more efficiently recover fiber removed from the mesh belt 72.

The density of the bristles 712 disposed to the surface of the brush roller 710 is also greater than the density of the mesh 72*a* of the mesh belt 72.

Because the bristles 712 more reliably penetrate the mesh 72*a* of the mesh belt 72, the second web former 70 can also more effectively remove fiber from the mesh belt 72 and better suppress skewing of the mesh belt 72.

The bristles 712 are fibers implanted in the surface of the brush roller 710. The diameter 712*a* of the bristles 712 is also smaller than the mesh 72*a* of the mesh belt 72.

Because the bristles 712 are fibers implanted in the surface of the brush roller 710, a configuration that effectively removes fiber from the mesh belt 72 can be provided.

A sheet manufacturing apparatus 100 (fibrous feedstock recycling device) according to the invention has a defibrator 20 for defibrating feedstock; a second web former 70 that conveys a second web W2 of defibrated material defibrated by the defibrator 20; and a processor (sheet forming device 80 and cutting device 90) that process the second web W2 conveyed by the second web former 70. The second web former 70 has numerous bristles 712 protruding from the surface, and a brush roller 710 (roller) disposed in contact with the mesh belt 72. So that the distal ends of the bristles 712 penetrate the mesh 72*a*, the sectional area of the bristles 712 of the brush roller 710 is smaller than the open area of the mesh 72*a* of the mesh belt 72.

The sheet manufacturing apparatus 100 thus comprised has the same effect as the effects of the second web former 70 described above. Because the accretion of unnecessary fiber on the second web W2 can be prevented, the sheet manufacturing apparatus 100 can prevent variations in the thickness of the second web W2 resulting from fiber accretion, and can manufacture sheets S of a desirable thickness.

6. Other Embodiments

The embodiments described above are examples of specific embodiments of the invention as described in the accompanying claims, do not limit the invention, and can be varied in many ways as described below without departing from the scope and spirit of the invention as described in the accompanying claims.

For example, the second web former 70 in the embodiments described above describe a configuration having a brush roller 710 and collection device 720 between the first roller 741 and second roller 742. However, the brush roller 710 and collection device 720 may be disposed between the second roller 742 and third roller 743, or between the third roller 743 snd fourth roller 744.

The second web former 70 described above is a configuration with a brush roller 710 and collection device 720. However, this configuration is not limited to the second web former 70, and the first web former 45 may also be configured with a brush roller 710 and collection device 720, or both the second web former 70 and first web former 45 may be configured with a brush roller 710 and collection device 720. When the first web former 45 has a brush roller 710 and collection device 720, the brush roller 710 and collection device 720 are disposed between the rollers 47 the mesh belt 46 travels around as described in the second web former 70 above.

The sheet manufacturing apparatus 100 is also not limited to manufacturing sheets S, and may be configured to make rigid sheets or paperboard comprising laminated sheets, or other web products. The manufactured product is also not limited to paper, and may be nonwoven cloth. The properties of the sheets S are also not specifically limited, and may be paper products that can be used as recording, writing, or printing on (such as copier paper, plain paper); wall paper, packaging paper, color paper, drawing paper, or bristol paper. When the sheet S is nonwoven cloth, it may be common nonwoven cloth, fiber board, tissue paper, kitchen paper, vacuum filter bags, filters, liquid absorption materials, sound absorption materials, cushioning materials, or mats.

At least part of the controller 110 of the sheet manufacturing apparatus 100 may also be embodied by hardware, configurations embodied by the cooperation of hardware and software, and is not limited to configurations of independent hardware resources. Programs executed by the main processor 111 may also be stored in other storage devices (not shown in the figure) than nonvolatile storage 120. Configurations that also acquire and execute programs stored on external devices through a communicator are also conceivable.

The sheet manufacturing apparatus 100 according to the foregoing embodiments describe a dry process sheet manufacturing apparatus that acquires material by defibrating feedstock in air, and manufactures sheets S using the acquired material and resin.

Application of the invention is not limited to such a device, however, and can be applied to a wet process sheet manufacturing apparatus that creates a solution or slurry of feedstock containing fiber in water or other solvent, and processes the feedstock into sheets.

The invention can also be applied to an electrostatic sheet manufacturing apparatus that causes material containing fiber defibrated in air to adhere to the surface of a drum by static electricity, for example, and then processes the feedstock adhering to the drum into sheets.

The entire disclosure of Japanese Patent Application No. 2017-217209, filed Nov. 10, 2017 is expressly incorporated by reference herein.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A conveyance device configured to convey defibrated material containing fiber deposited on a belt having multiple holes, comprising:
a roller having multiple protrusions protruding from the surface, and disposed to contact the belt,
the sectional area of the protrusions of the roller being smaller than the open area of the holes in the belt, enabling the distal ends of the protrusions to penetrate the holes; and
a collection device configured to recover fiber from the belt,
the collection device being disposed to a position opposite the roller with the belt therebetween, or a position downstream in the conveyance direction of the belt from the roller with the belt therebetween.

2. The conveyance device described in claim 1, wherein:
a plane shape of the section of the protrusions is set to a size that fits in the shape of the holes in the belt.

3. The conveyance device described in claim 1, wherein:
the belt is an endless belt that is mounted on and circulates around multiple rollers.

4. The conveyance device described in claim 3, wherein:
the multiple rollers on which the endless belt is mounted include a first roller disposed closest to a separation point on the conveyance path of the belt where the defibrated material separates from the belt, and a second roller disposed downstream from the first roller in the conveyance direction of the belt; and
the roller is disposed between the first roller and the second roller.

5. The conveyance device described in claim 1, wherein:
the roller is disposed on the side of the belt on which the defibrated material is deposited.

6. The conveyance device described in claim 1, wherein:
the roller is disposed on the side of the belt on which the defibrated material is not deposited.

7. The conveyance device described in claim 1, wherein:
the roller turns at a speed faster than the conveyance speed of the belt.

8. The conveyance device described in claim 1, wherein:
the collection device includes a collection roller configured rotatably and disposed in contact with the belt or a position with the protrusions protruding from the roller in contact with the belt; and
the collection roller turns at a speed faster than the conveyance speed of the belt.

9. The conveyance device described in claim 1, wherein:
the density of the protrusions disposed to the surface of the roller is greater than the density of the holes in the belt.

10. The conveyance device described in claim 1, wherein:
the protrusions are fibers implanted to the surface of the roller; and
the diameter of the protrusions is smaller than the holes in the belt.

11. A fibrous feedstock recycling device comprising:
a defibrator that defibrates feedstock;
a conveyance device that conveys defibrated material defibrated by the defibrator deposited on a belt having multiple holes; and
a process unit that processes the defibrated material conveyed by the conveyance device;
the conveyance device comprising:
a roller with numerous protrusions protruding from the surface and disposed in contact with the belt, the sectional area of the protrusions of the roller being smaller than the open area of the holes in the belt, enabling the distal ends of the protrusions to penetrate the holes; and a collection device configured to recover fiber from the belt, the collection device being disposed to a position opposite the roller with the belt therebetween, or a position downstream in the conveyance direction of the belt from the roller with the belt therebetween.

* * * * *